(12) United States Patent
Ueda et al.

(10) Patent No.: US 7,574,908 B2
(45) Date of Patent: Aug. 18, 2009

(54) FLOW RATE MEASURING DEVICE

(75) Inventors: Naotsugu Ueda, Shiga-ken (JP); Satoshi Nozoe, Toyonaka (JP); Yasushi Shimomoto, Kyoto (JP)

(73) Assignee: OMRON Corporation, Kyoto (JP)

( * ) Notice: Subject to any disclaimer, the term of this patent is extended or adjusted under 35 U.S.C. 154(b) by 120 days.

(21) Appl. No.: 11/913,291

(22) PCT Filed: Apr. 19, 2006

(86) PCT No.: PCT/JP2006/308179

§ 371 (c)(1),
(2), (4) Date: Oct. 31, 2007

(87) PCT Pub. No.: WO2006/120848

PCT Pub. Date: Nov. 16, 2006

(65) Prior Publication Data

US 2009/0078039 A1    Mar. 26, 2009

(30) Foreign Application Priority Data

May 2, 2005    (JP)    ............................. 2005-134239

(51) Int. Cl.
*G01F 5/00* (2006.01)
*G01F 1/68* (2006.01)
(52) U.S. Cl. ........................................ 73/202; 73/202.5
(58) Field of Classification Search ................... 73/202, 73/202.5
See application file for complete search history.

(56) References Cited

U.S. PATENT DOCUMENTS 3,374,673 A    3/1968    Trageser
4,930,357 A *  6/1990    Thurston et al. ......... 73/861.19

(Continued)

FOREIGN PATENT DOCUMENTS

EP    0483515    5/1992

(Continued)

OTHER PUBLICATIONS

Notification of Transmittal of Copies of Translation of the International Preliminary Report on Patentability (Chapter I or Chapter II of the Patent Cooperation Treaty) for International Application No. PCT/JP2006/308179, mailed on Nov. 15, 2007 (7 pages).

(Continued)

*Primary Examiner*—Harshad Patel
(74) *Attorney, Agent, or Firm*—Osha • Liang LLP

(57) ABSTRACT

A secondary flow channel of a flow rate measuring device includes: a guide flow channel in which an upstream side communicates with a guide port serving as a first bifurcation point, and a downstream side serves as a second bifurcation point; a first secondary flow channel in which an upstream side is bifurcated from a guide flow channel at the second bifurcation point and formed to be parallel to a primary flow channel, and a downstream side communicates with a discharge port; a second secondary flow channel in which an upstream side is bifurcated from the guide flow channel at the second bifurcation point and formed to cross the primary flow channel; and a detection flow channel in which an upstream side communicates with a downstream side of the second secondary flow channel, a flow rate detecting element is disposed, and a downstream side communicates with the discharge port.

11 Claims, 16 Drawing Sheets

U.S. PATENT DOCUMENTS 4,990,293 A * 2/1991 Macosko et al. ........... 264/40.1
6,655,207 B1 12/2003 Speldrich et al.

FOREIGN PATENT DOCUMENTS

| | | |
|---|---|---|
| EP | 1091195 | 4/2001 |
| EP | 1568973 | 8/2005 |
| JP | 57-10414 | 1/1982 |
| JP | 59-77027 | 5/1984 |
| JP | 9-43020 | 2/1997 |
| JP | 10-54741 | 2/1998 |
| JP | 2000-274662 | 10/2000 |
| JP | 2001-174305 | 6/2001 |
| JP | 3340655 | 8/2002 |
| JP | 2003-523506 | 8/2003 |
| JP | 2004-29033 | 1/2004 |

OTHER PUBLICATIONS

International Search Report w/ English Translation for PCT/JP2006/308179 mailed May 30, 2006 (4 pages).

Patent Abstracts of Japan 11-118542 published Apr. 30, 1999 (1 page).

Patent Abstracts of Japan 57-010414 published Jan. 20, 1982 (1 page).

Patent Abstracts of Japan 2000-274662 published Oct. 3, 2000 (1 page).

Patent Abstracts of Japan 10-054741 published Feb. 24, 1998 (1 page).

Patent Abstracts of Japan 2004-029033 published Jan. 29, 2004 (1 page).

Patent Abstracts of Japan 09-043020 published Feb. 14, 1997 (1 page).

Patent Abstracts of Japan 2001-174305 published Jun. 29, 2001 (1 page).

Chinese Office Action for Chinese Application No. 2006800202257, mailed on Sep. 19, 2008 (6 pages).

European Search Report for 06732086.1 mailed May 08, 2009 (6 pages).

* cited by examiner

FLOW RATE MEASURING DEVICE

TECHNICAL FIELD

The present invention relates to a flow rate measuring device, for example, a small sized flow rate measuring device used for an industrial equipment for monitoring an air flow rate in factories, a medical equipment such as a therapeutic instrument for sleep apnea syndrome.

BACKGROUND ART

In general, among the flow rate measuring devices, in a straight pipe type flow rate measuring device which directly measures a large flow rate, it is required to increase a diameter of piping because a flow rate is reduced to a measurable region of a flow rate detecting element. Thus, there was a limit in size reduction of the device. In particular, if the flow rate is increased, output linearity of the flow rate detecting element is lowered, and it becomes difficult to perform highly accurate measurement. Therefore, in order to improve the measurement accuracy as well as promote the size reduction, a small sized flow rate measuring device is proposed in which a primary flow channel is provided with a secondary flow channel, a flow rate of a fluid flowing through the secondary flow channel is measured, and based on the measured flow rate, a flow rate of the fluid flowing through the primary flow channel is converted.

Conventionally, as a flow rate measuring device provided with a secondary flow channel, for example, a flow rate module in which a primary flow channel is provided with a flow limiter is known (see Patent Document 1). Further, a combustion gas flow rate measuring device constructed of a first main pipeline block and a second main pipeline block is known (Patent Document 2).

Patent Document 1: Domestic re-publication of PCT international application No. 2003-523506
Patent Document 2: JP Patent No. 03340655

DISCLOSURE OF INVENTION

Problem to be Solved by the Invention

However, according to the former, a pressure loss is large, and an energy loss is large. On the other hand, according to the latter, since the secondary flow channel is formed as a component, two parts are required. Therefore, the number of parts and the number of assembling processes are large.

Further, even in the secondary flow channel type flow rate measuring device, if piping in an equipment to be connected is complicated, a flow rate distribution of a fluid flowing inside a primary flow pipe is liable to become nonuniform. If the flow rate distribution is nonuniform, a flow dividing ratio is changed and it becomes difficult to achieve an accurate flow rate measurement.

Moreover, for example, dust and the like are sometimes included in a fluid to be measured. If the dust and the like adhere to a flow rate detecting element, characteristics of the flow rate detecting element are changed, and it is liable to be broken.

In view of the above problem, an object of the present invention is to provide a flow rate measuring device which is small in size, in which dust and the like hardly penetrate, which has high measurement accuracy, and which has a small pressure loss.

Means of Solving the Problem

In order to solve the above problem, a flow rate measuring device of the present invention comprises: a primary flow pipe having a primary flow channel through which a fluid flows, an orifice provided in the primary flow channel and throttling a fluid flow, and a secondary flow channel block provided with a secondary flow channel, the secondary flow channel block being integrally provided on the primary flow pipe, one end of the secondary flow channel block communicating with a guide port provided on an upstream side of the orifice, and the other end of the secondary flow channel block communicating with a discharge port provided on a downstream side of the orifice, wherein the secondary flow channel comprises:

a guide flow channel in which an upstream side communicates with the guide port serving as a first bifurcation point, and a downstream side serves as a second bifurcation point;

a first secondary flow channel in which an upstream side is bifurcated from the guide flow channel at the second bifurcation point and formed so as to be parallel to the primary flow channel, and a downstream side communicates with the discharge port;

a second secondary flow channel in which an upstream side is bifurcated from the guide flow channel at the second bifurcation point and formed so as to cross the primary flow channel; and a detection flow channel in which an upstream side communicates with a downstream side of the second secondary flow channel, a flow rate detecting element is disposed, and a downstream side communicates with the discharge port.

EFFECT OF THE INVENTION

According to the present invention, the flow of the fluid is bifurcated twice at the first and second bifurcation points. Therefore, it is possible to reduce the flow rate to a measurable region of the flow rate detecting element without causing a large pressure loss, while maintaining a reduction in size of the device. This can take advantage of the output linearity of the flow rate detecting element, so that a small-sized flow rate measuring device with high measurement accuracy can be obtained. Further, that the flow is bifurcated twice makes dust and the like included in the fluid hardly penetrate into the detection flow channel, so that it is possible to avoid a failure caused by dust and the like.

A flow rate detecting element of the present invention comprises: a primary flow pipe having a primary flow channel through which a fluid flows, an orifice provided in the primary flow channel and throttling a fluid flow, and a secondary flow channel block provided with a secondary flow channel, the secondary flow channel block being integrally provided on the primary flow pipe, one end of the secondary channel block communicating with a pair of guide ports oppositely provided on an upstream side of the orifice, and the other end of the secondary channel block communicating with a pair of discharge ports oppositely provided on a downstream side of the orifice, wherein the secondary flow channel comprises:

a pair of guide flow channels in each of which an upstream side communicates with each of the guide ports serving as a first bifurcation point, and a downstream side serves as a second bifurcation point;

a pair of first secondary flow channels in each of which an upstream side is bifurcated from each of the guide flow channels at the second bifurcation point and formed so as to be parallel to the primary flow channel, and a downstream side communicates with each of the discharge ports;

a pair of second secondary flow channels in each of which an upstream side is bifurcated from each of the guide flow channels at the second bifurcation point and formed so as to cross the primary flow channel; and a detection flow channel, in which an upstream side communicates with a downstream side of each of the second secondary flow channels, a flow rate detecting element is disposed, and a downstream side communicates with each of the discharge ports.

According to the present invention, in addition to the above effect, fluids that have flown from the pair of guide ports provided at the opposite positions are merged in the detection flow channel, and a flow rate of the merged fluid is measured by the flow rate detecting element. Therefore, even if the flow rate in the primary flow channel is nonuniform, it is averaged in the detection flow channel. Therefore, a flow rate measuring device with higher measurement accuracy is obtained.

In an embodiment of the present invention, a flow channel cross sectional area of the first secondary flow channel may be adjustable.

According to the present embodiment, by adjusting the flow channel cross sectional area of the first secondary flow channel, the flow rate of the fluid flowing through the detection channel can be adjusted. Therefore, a range of selection of available flow rate detecting elements is broadened.

In another embodiment of the present invention, the guide flow channel, in which the guide port and the second bifurcation point located on the upstream side of the guide flow channel are located on a same vertical line, and a discharge flow channel, in which the discharge port and the discharge flow channel are located on a same vertical line, may be provided in parallel.

According to the present embodiment, since the guide flow channel and the discharge flow channel are disposed in the same direction, mold release of a molded product from a mold can be simultaneously performed during molding operation, which makes it possible to mold the guide flow channel and the discharge flow channel integrally with the primary flow channel.

In a different embodiment of the present invention, the guide flow channel communicating with the guide port may be formed into a roughly L-shape in cross section so that a part of a fluid that has flown in flows in a direction opposite to a flow of the primary flow channel.

According to the present embodiment, a part of a fluid that has flown into the guide flow channel flows in the direction opposite to the direction of the flow of the primary flow channel, and the remaining part flows into the discharge flow channel. Therefore, the detection flow channel makes dust and the like hardly penetrate, and there is an effect that a failure caused by dust and the like can be avoided more reliably.

BRIEF DESCRIPTION OF DRAWINGS

FIG. 5B shows a state in which a cover is removed;

DESCRIPTION OF NUMERALS

Figure 1A:
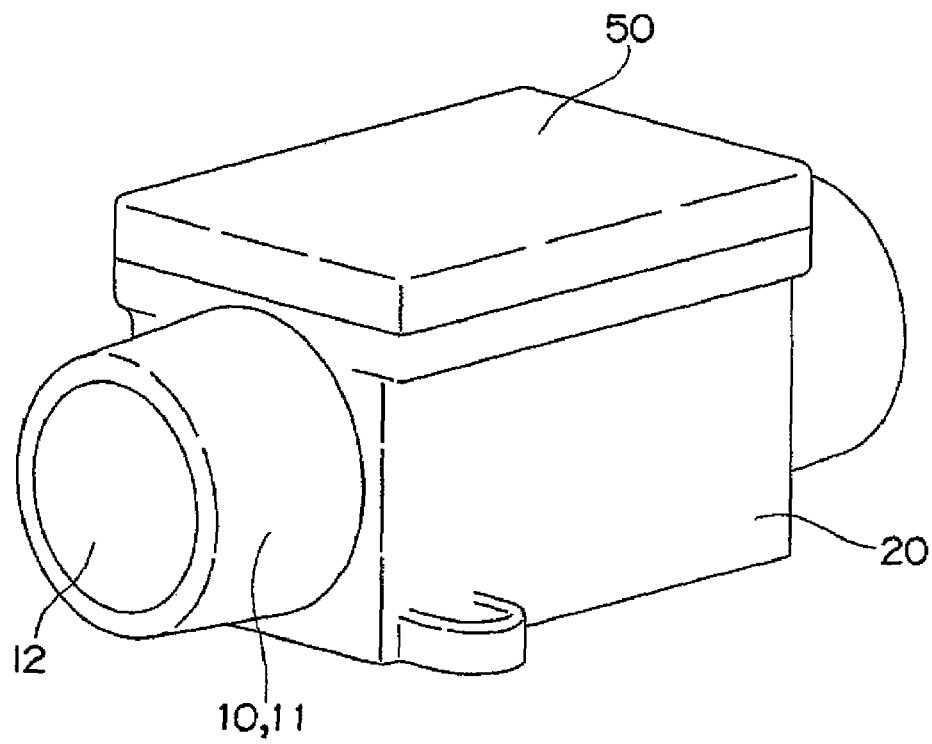
FIG. 1A and FIG. 1B are a perspective view and a left side view, respectively, of a flow rate measuring device of the invention according to the present application.

10: base
11: primary flow pipe
12: primary flow channel
13: orifice
14: first adjustment rib
15: second adjustment rib
20: secondary flow channel block
20a: second bifurcation point
20b: first merging point
20c: third bifurcation point
20d: second merging point
21: guide port (first bifurcation point)
22: vertical guide groove
23: first secondary flow channel
23a: partition wall
24: second secondary flow channel
25: third secondary flow channel (detection flow channel)
26: fourth secondary flow channel
27: vertical discharge groove
28: discharge port
29: partition wall
29a: projection
30: sealing plate
31: measurement hole
40: circuit board
41: flow rate detecting element
42: control circuit
50: cover Best Mode for Carrying Out the Invention An embodiment of the present invention will be described with reference to the accompanying drawings of FIG. 1 through FIG. 16.

Figure 1B:
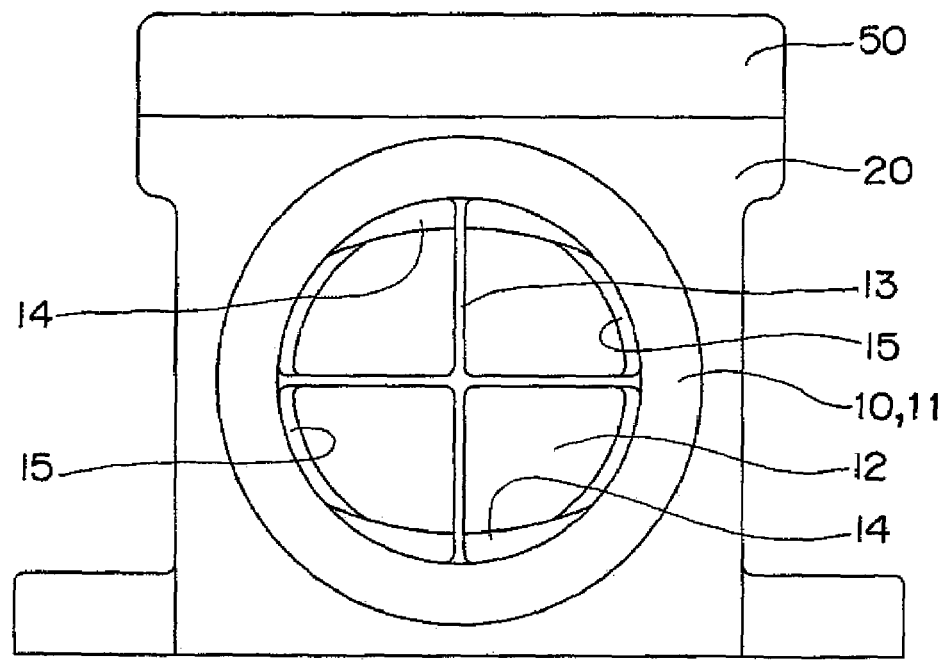
Figure 2:
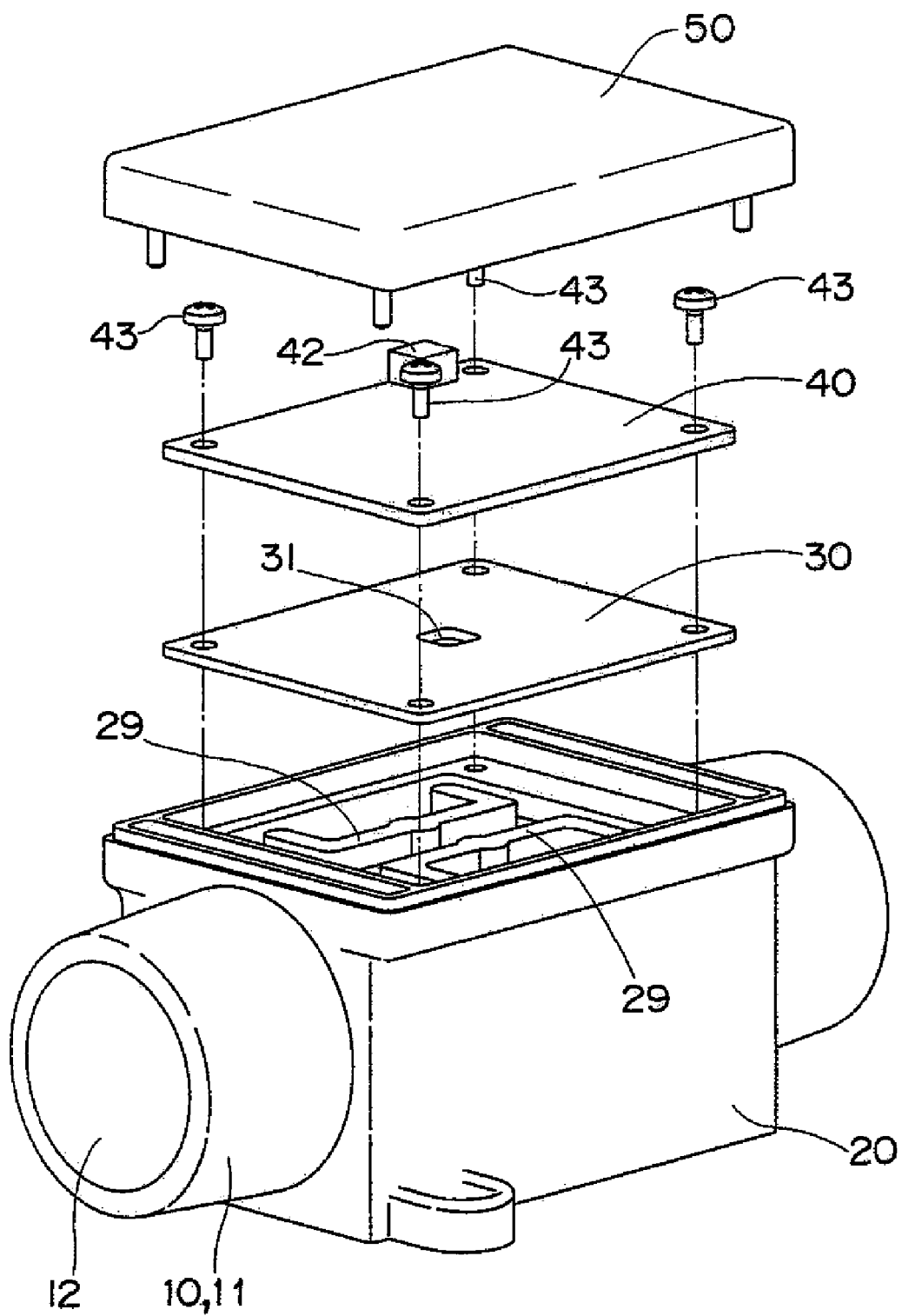
FIG. 2 is an exploded perspective view of the flow rate measuring device shown in FIG. 1.

As shown in FIG. 1 and FIG. 2, a flow rate measuring device of the present embodiment is constructed of a base 10 integrally molded with a secondary flow channel block 20 for forming secondary flow channels on an outer circumferential surface of a primary flow pipe 11, a sealing plate 30 having, at its central portion, a measurement hole 31 and sealing an opening of the secondary flow channel block 20, a circuit board 40, whose lower surface has, at its center, a flow rate detecting element 41 to be inserted through the measurement hole 31, and which is stacked on the sealing plate 30, and a cover 50 for covering the opening of the secondary flow channel block 20. The sealing plate 30 and the circuit board 40 are fixed to the secondary flow channel block 20 through screws 43.

The base 10 is provided with a cross-shaped orifice 13 at a central portion of an inner circumferential surface of a primary flow channel 12 passing through inside of the primary flow pipe 11. In the inner circumferential surface provided with the orifice 13, first adjustment ribs 14, 14 are protrusively provided so as to face each other above and below, while second adjustment ribs 15, 15 are protrusively provided so as to face each other right and left. The first and second adjustment ribs 14, 15 are provided in order to correct a nonuniform flow rate distribution and perform more accurate flow rate measurement.

The sealing plate 30 is made of an insulating material such as rubber for preventing leakage of a fluid and protecting the circuit board 40.

The flow rate detecting element 41 attached to the center of the lower surface of the circuit board 40 detects data, and based on the detected data, a control circuit 42 attached to an upper surface the circuit board 40 converts and outputs a flow rate of the primary flow channel 12. As the flow rate detecting element 41, for example, a heat type flow rate detecting element, a hot-wire type flow rate detecting element and the like are given, but it is not specifically limited.

Figure 3A:
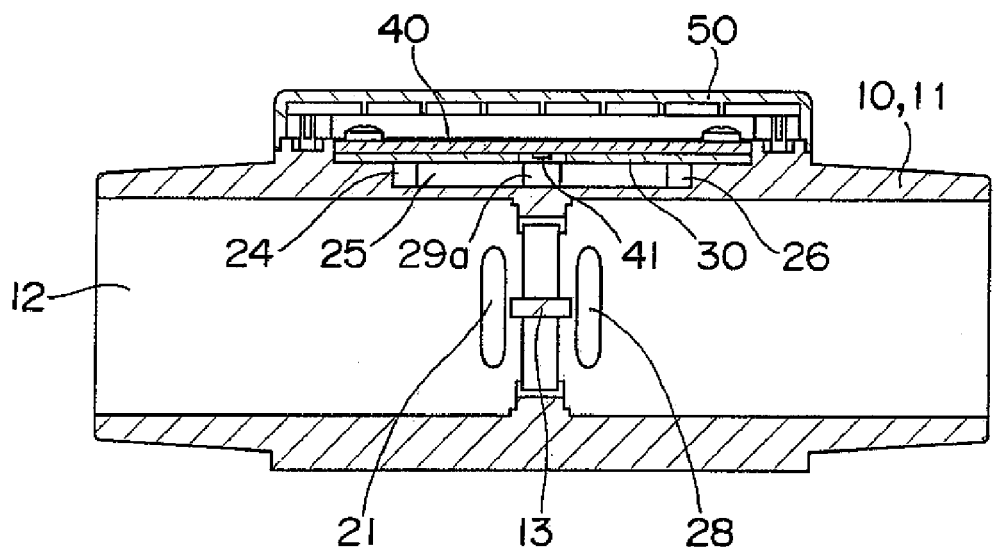
FIG. 3A and FIG. 3B are a cross sectional view and a plan view, respectively, of the flow rate measuring device shown in FIG. 1.
Figure 3B:
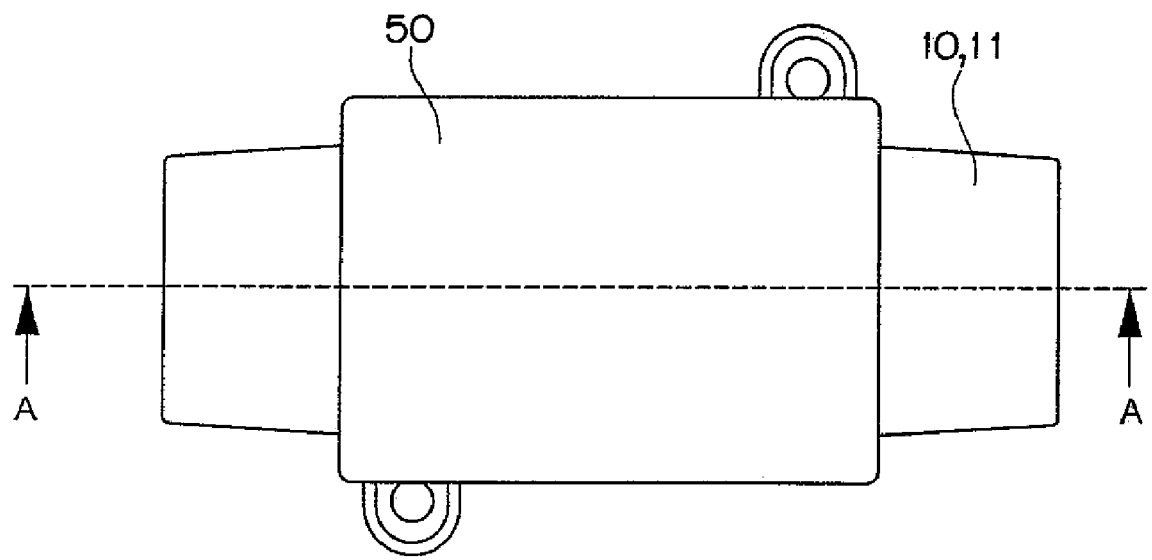
Figure 4:
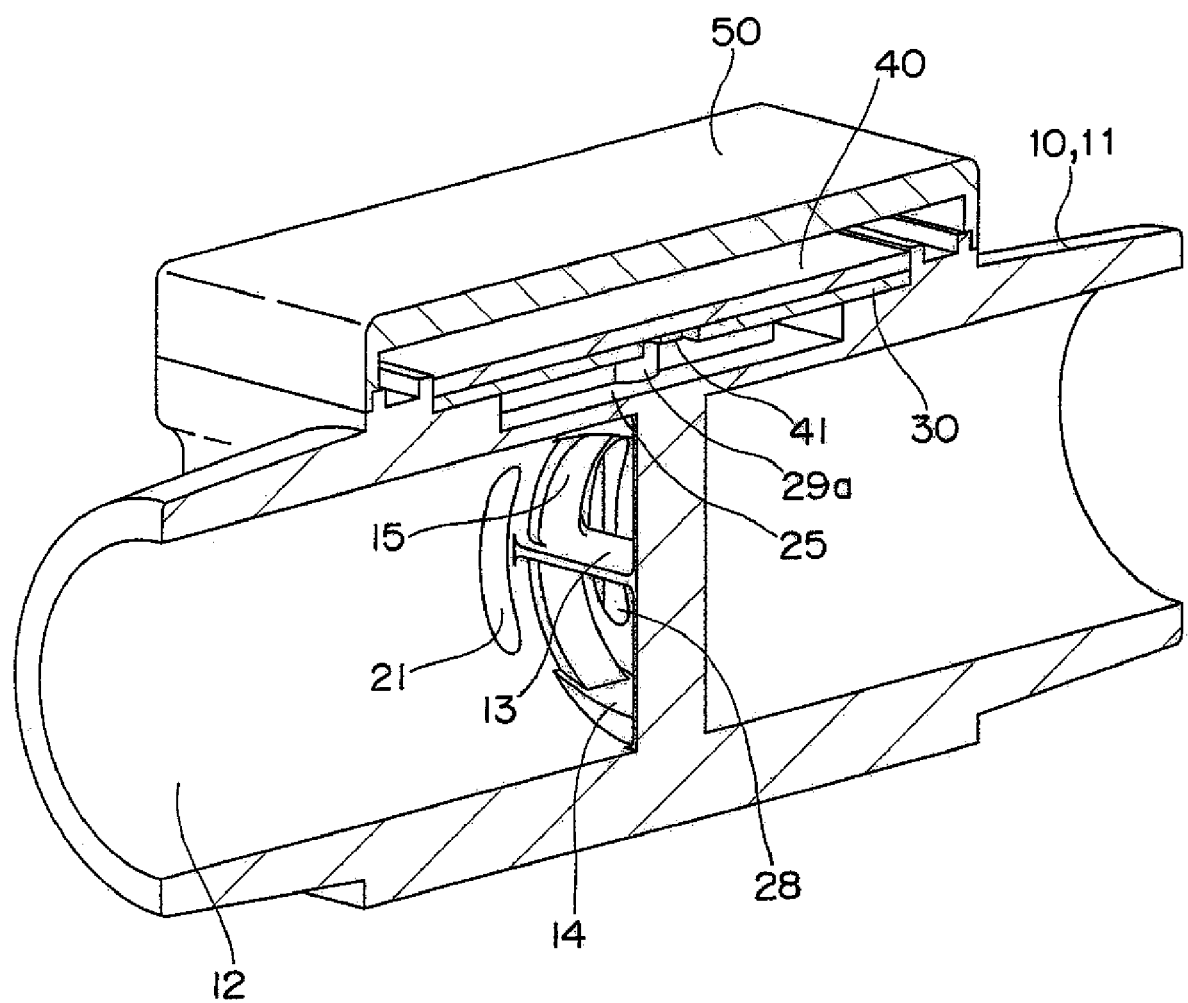
FIG. 4 is a cross sectional perspective view of the flow rate measuring device shown in FIG. 1.
Figure 5A:
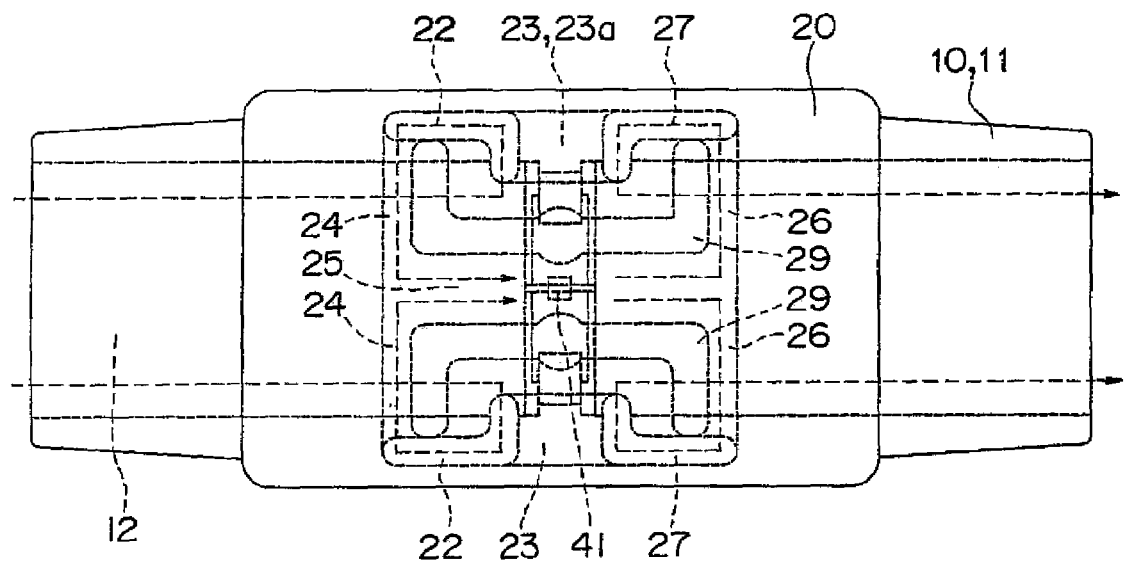
FIG. 5A and FIG. 5B are plan views of the flow rate measuring device shown in FIG. 1.
Figure 5B:
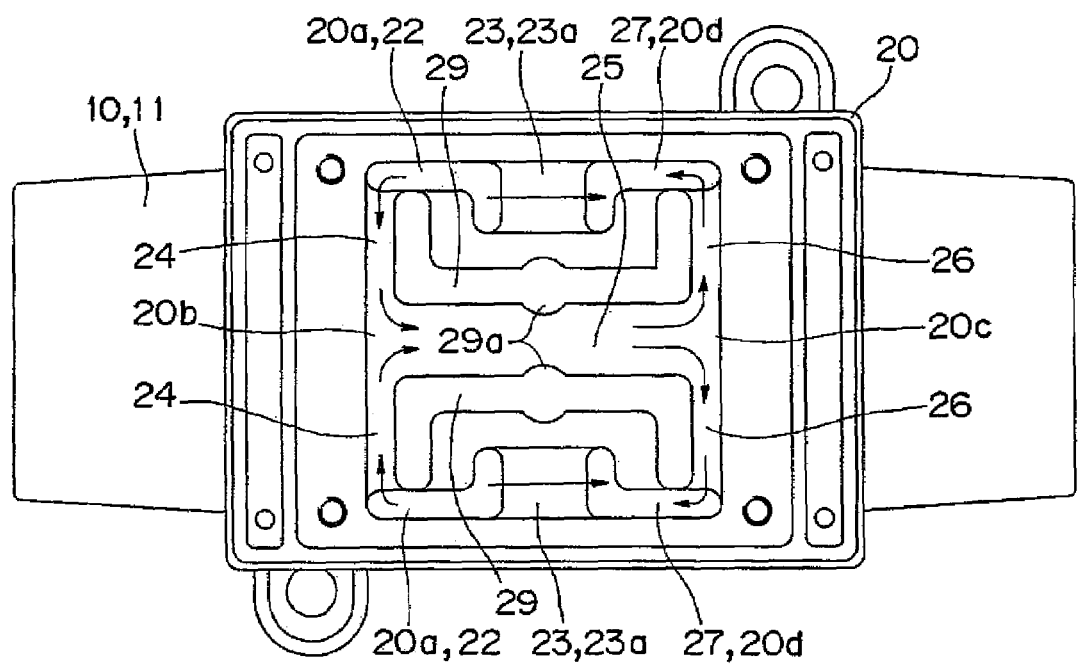

On the other hand, as shown in FIG. 3, the secondary flow channel formed in the secondary flow channel block 20 starts from a pair of guide ports 21, 21 that are first bifurcation points, which are provided at opposite positions, right and left, of the inner circumferential surface located in the vicinity of an upstream side of the orifice 13, and ends at a pair of discharge ports 28, 28, which are provided at opposite positions, right and left, of the inner circumferential surface located in the vicinity of a downstream side of the orifice 13.

Figure 6:
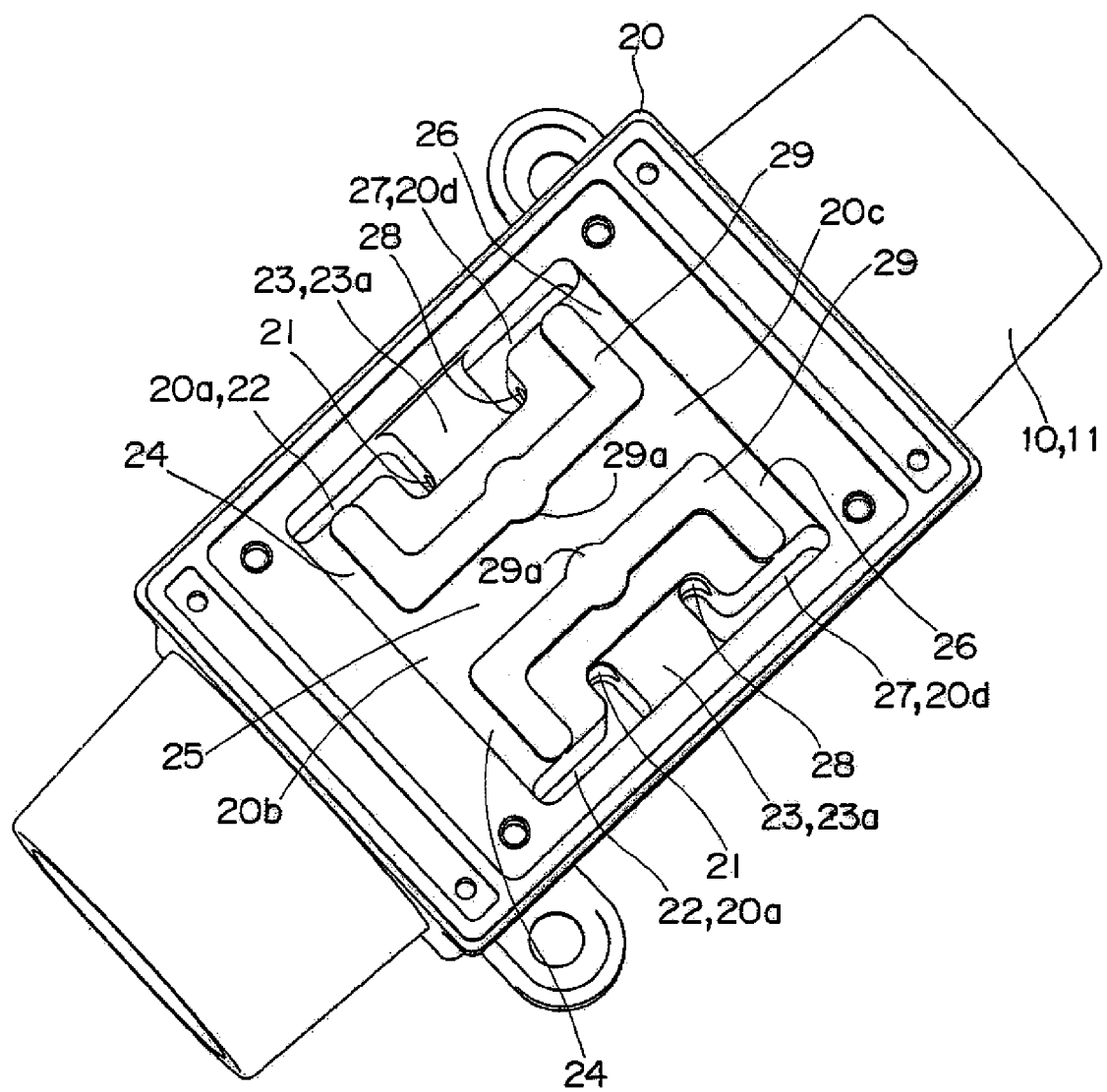
FIG. 6 is a perspective view of the flow rate measuring device shown in FIG. 5B.
Figure 7:
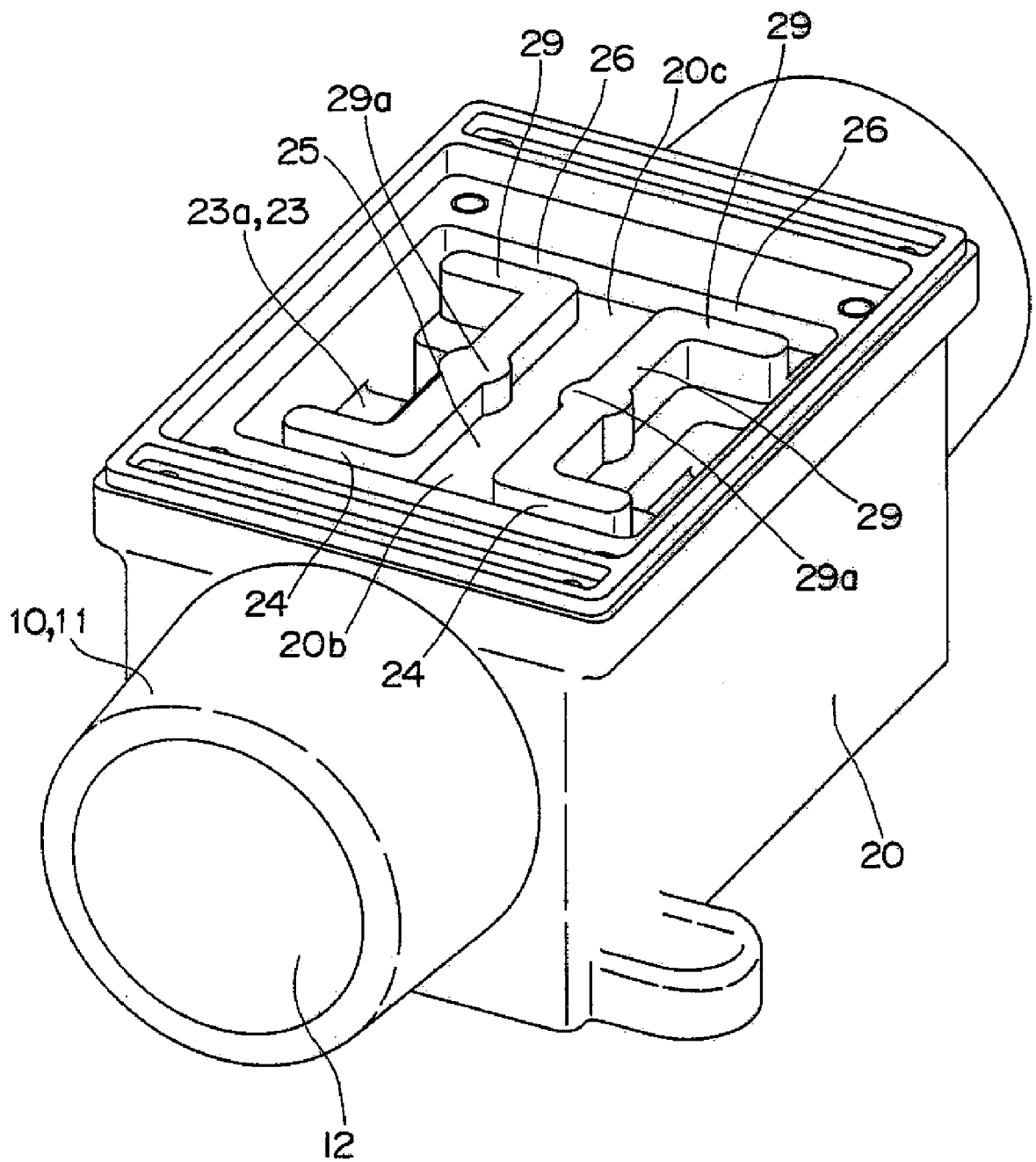
FIG. 7 is a perspective view of the flow rate measuring device shown in FIG. 5B, which is seen in a different angle.
Figure 8:
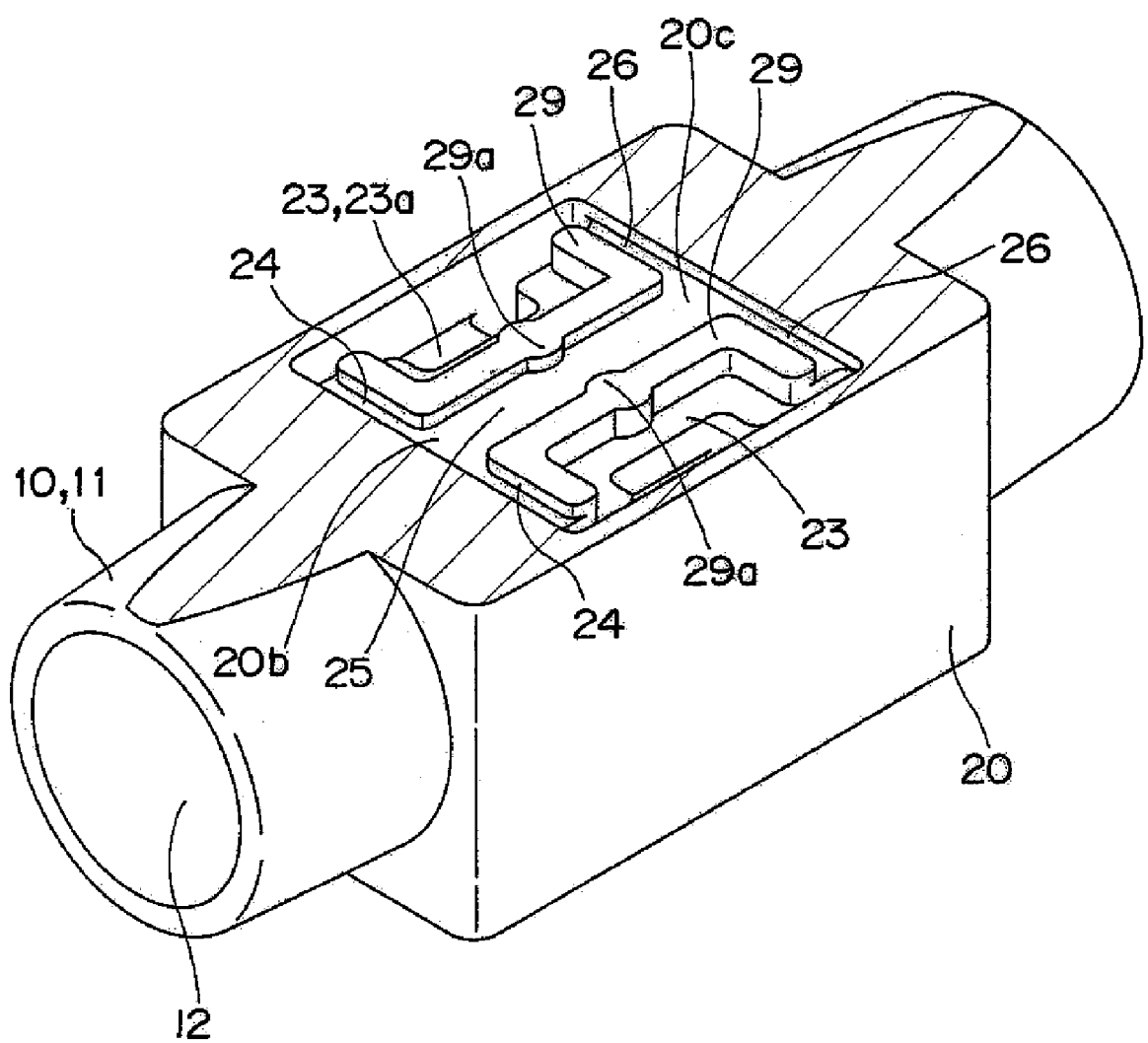
FIG. 8 is a plan cross sectional perspective view of FIG. 7.
Figure 9:
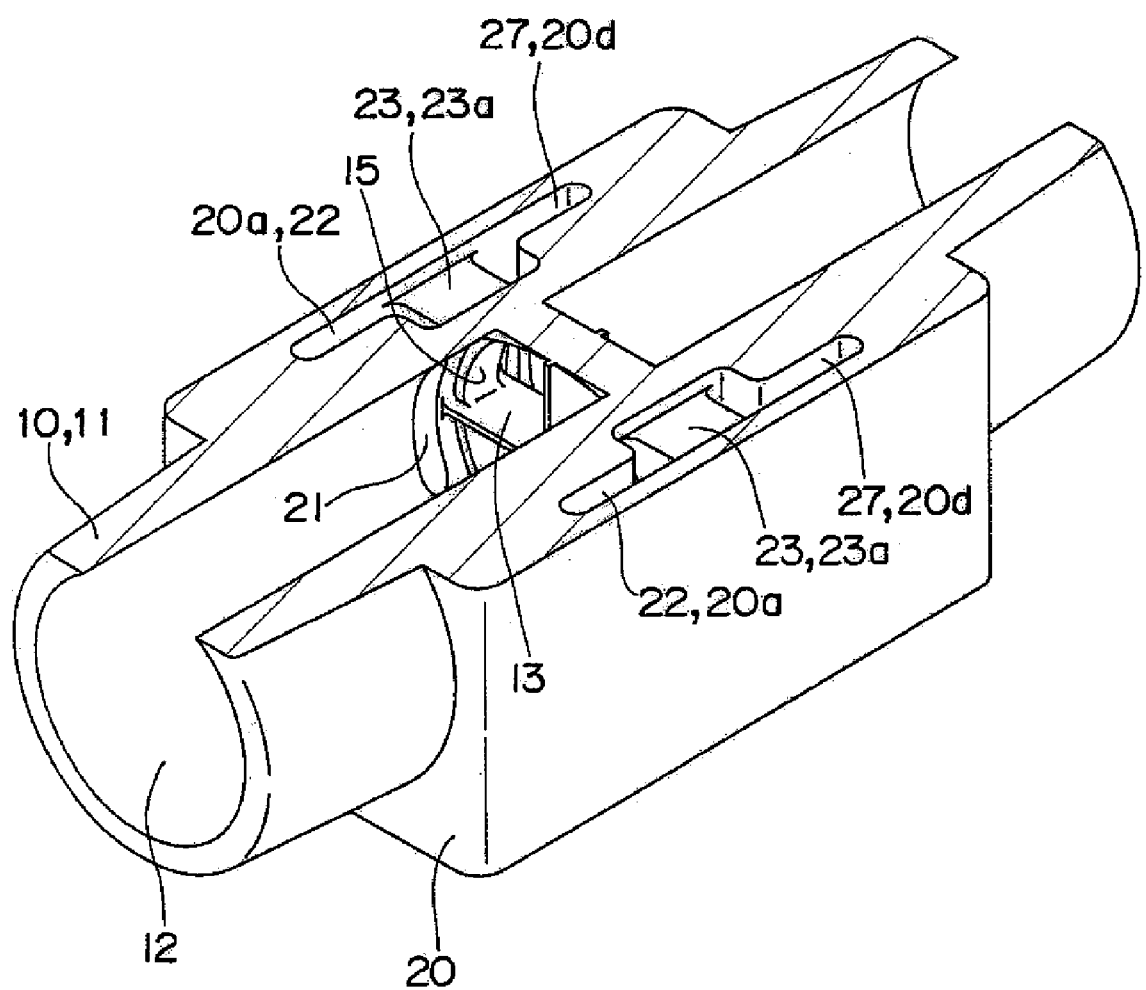
FIG. 9 is a plan cross sectional perspective view of FIG. 7, which is cut at a different position from that of FIG. 8.
Figure 10:
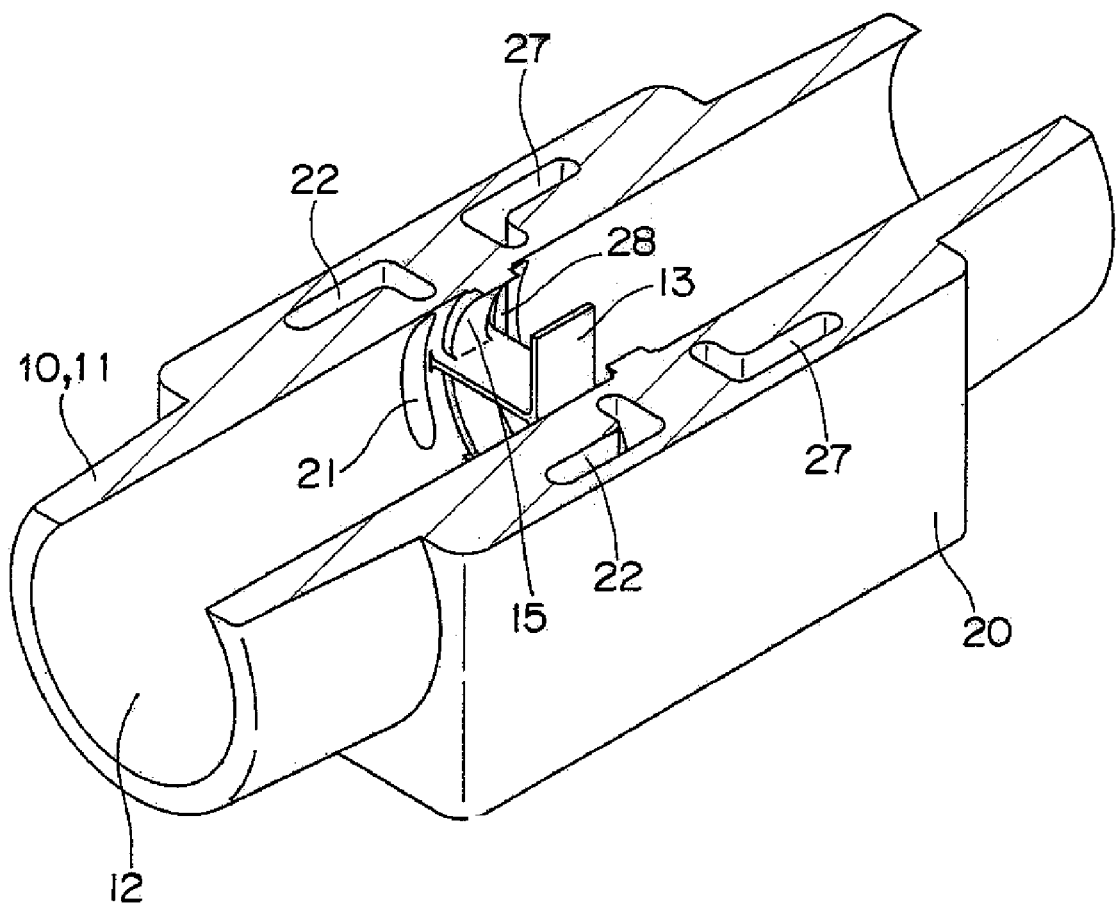
FIG. 10 is a plan cross sectional perspective view of FIG. 7, which is cut at a different position from that of FIG. 9.
Figure 11:
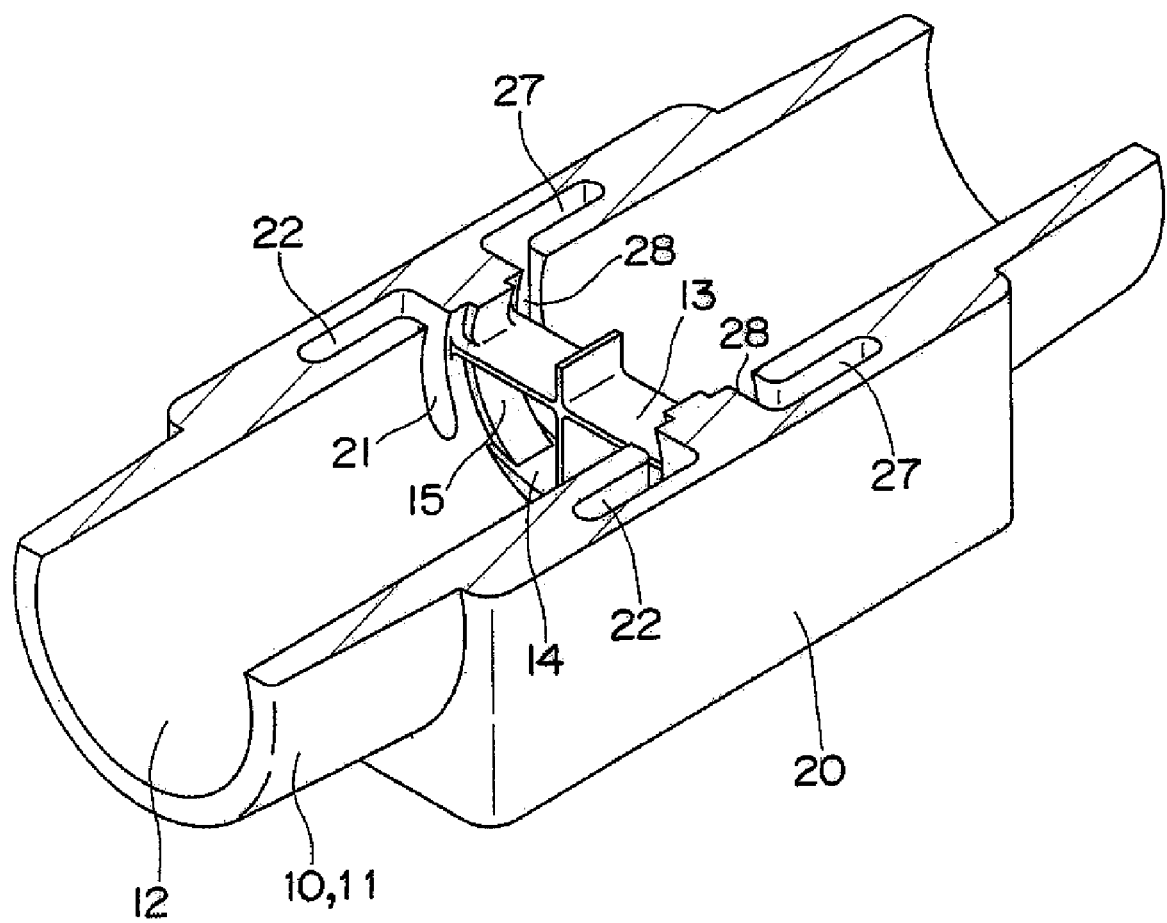
FIG. 11 is a plan cross sectional perspective view of FIG. 7, which is cut at a different position from that of FIG. 10.
Figure 12A:
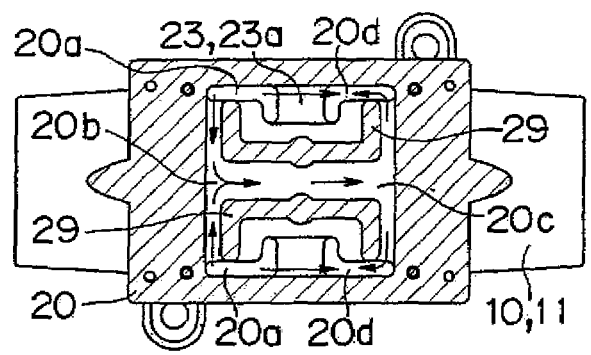
FIG. 12A through FIG. 12D show horizontal cross sectional perspective views and FIG. 12E is a front view showing cut positions.
Figure 12B:
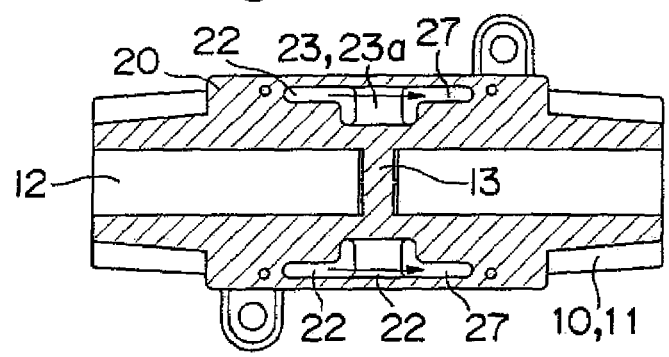
Figure 12C:
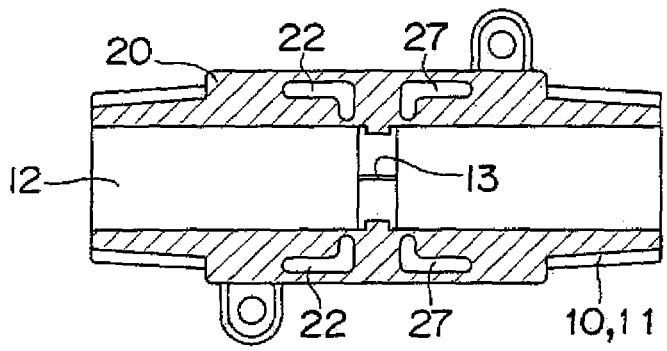
Figure 12D:
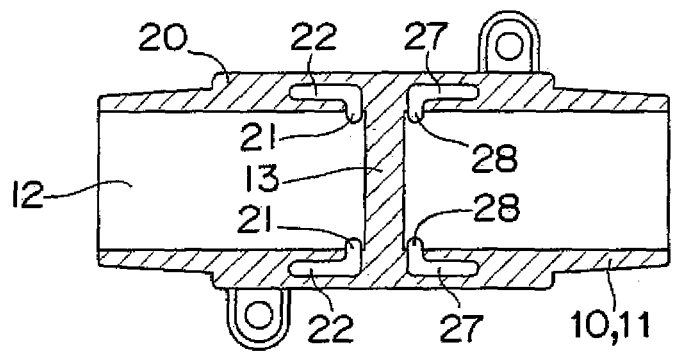
Figure 12E:
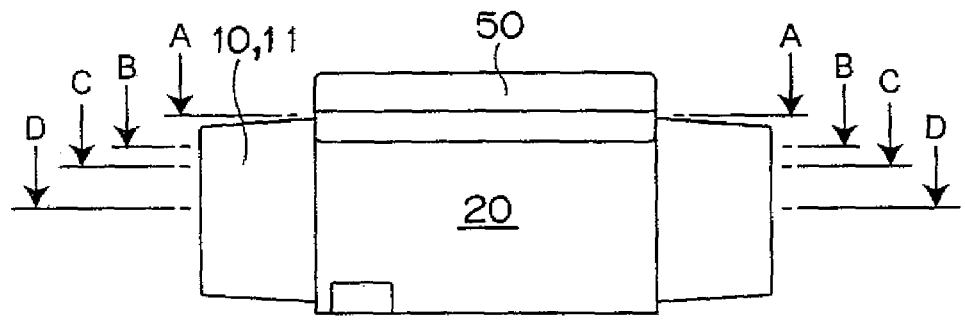
Figure 13A:
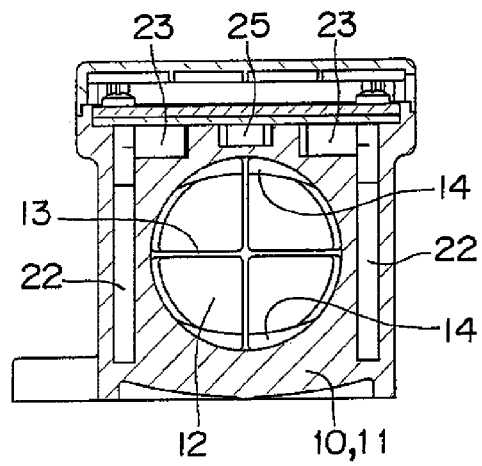
FIG. 13A through FIG. 13D show side cross sectional views and FIG. 13E is a plan view showing cut positions.
Figure 13B:
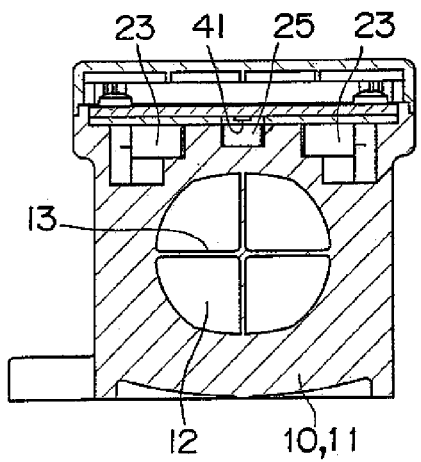
Figure 13C:
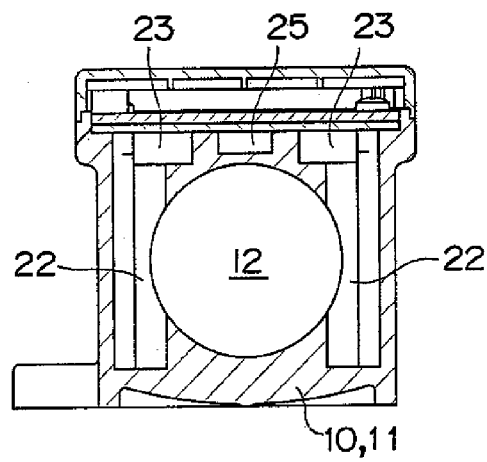
Figure 13D:
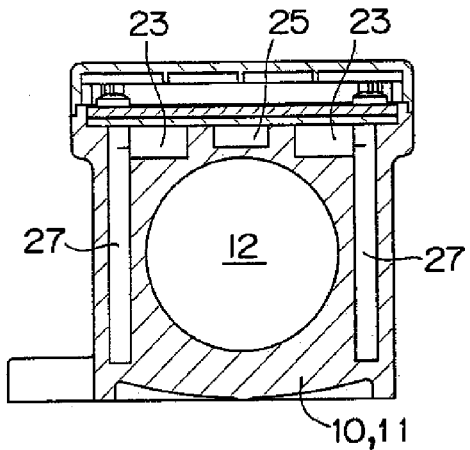
Figure 13E:
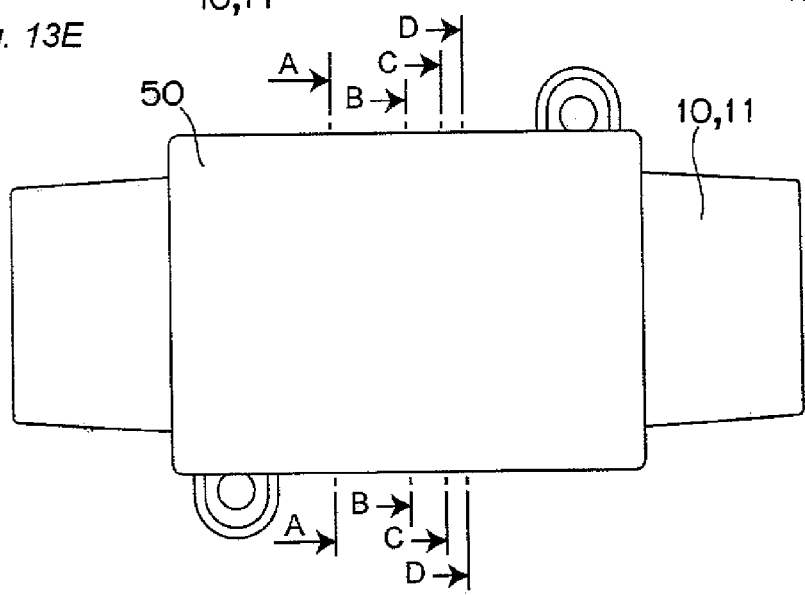
Figure 14:
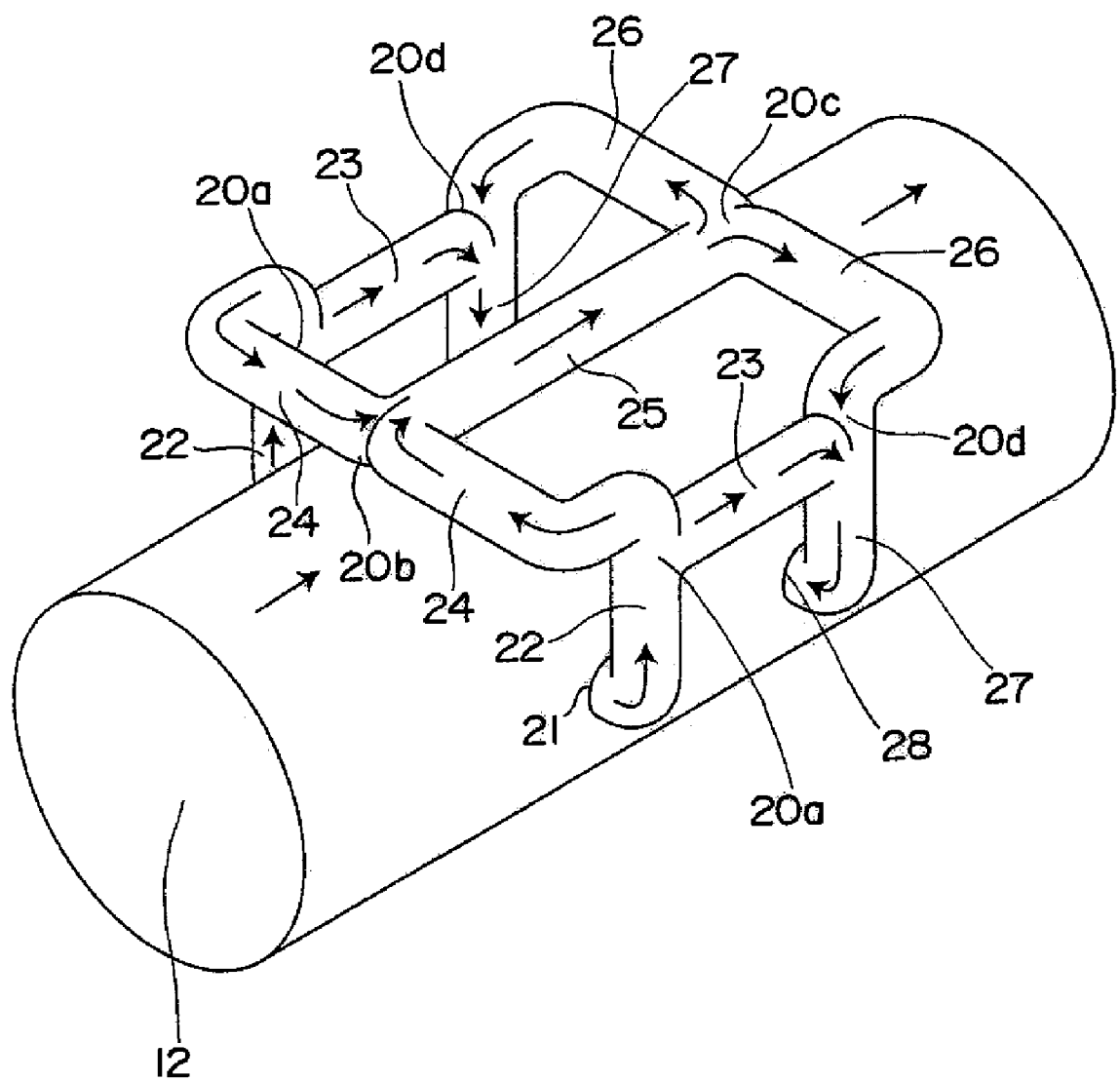
FIG. 14 is a perspective view simply showing flow channels of the flow rate measuring device of the invention of the present application.
Figure 15:
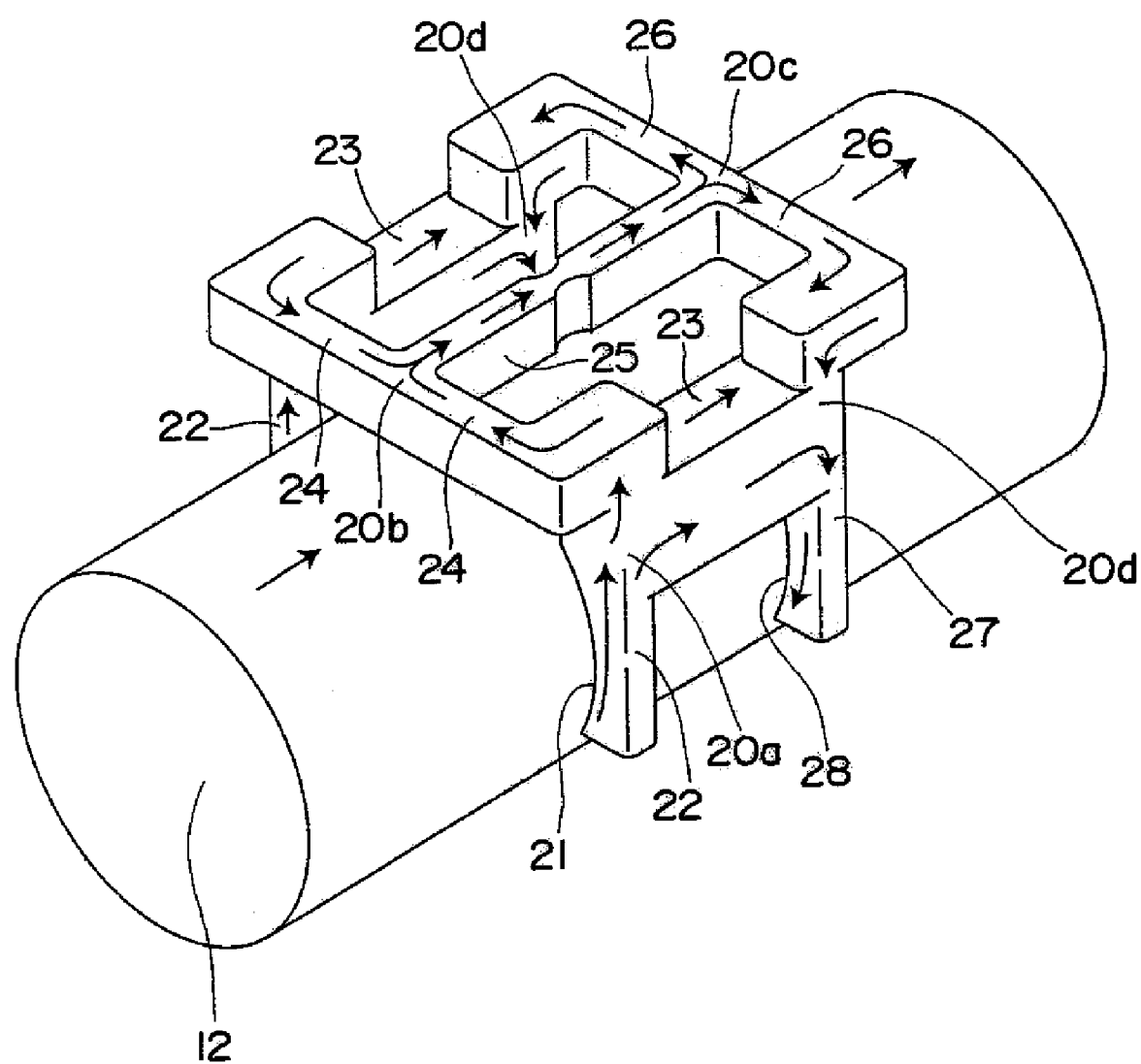
FIG. 15 is a perspective view schematically showing flow channels of the flow rate measuring device of the invention of the present application.

As shown in FIG. 6, the secondary flow channel is formed so as to be line symmetrical with respect to each other, and vertical guide grooves 22, 22, each of which has a roughly L-shape in plan view for raising a fluid that has flown from each of the guide ports 21, 21, are provided. The secondary flow channel is bifurcated into a first secondary flow channel 23 formed parallel to the primary flow channel 12 and a second secondary flow channel 24 formed in a direction perpendicular to the primary flow channel 12 at a second bifurcation point 20*a* located at an upper end of the vertical guide groove 22. The first secondary flow channel 23 communicates with a roughly L-shaped vertical discharge groove 27 in plan view across a partition wall 23*a* located at a center.

The second secondary flow channel 24 is merged with another second secondary flow channel 24 provided so as to be line symmetrical thereto at a first merging point 20*b* and communicates with a third flow channel 25 that is a detection flow channel formed parallel to the primary flow channel 12. Protrusions 29*a* are formed so as to face each other at intermediate portions of opposite surfaces of a pair of roughly C-shaped partition walls 29 provided to form the third flow channel 25, so that a detection region with a narrow width is formed. This is for correcting a nonuniform flow by throttling the flow channel. The third flow channel 25 is bifurcated into a pair of right and left fourth secondary flow channels 26, 26 respectively at a third bifurcation point 20*c* located on a downstream side of the third flow channel 25. Then, each fourth secondary flow channel 26 is merged with a downstream side of the first secondary flow channel 23 at a second merging point 20*d* located at a downstream side thereof, and communicates with the vertical discharge groove 27. Lastly, the vertical discharge groove 27 communicates with the primary flow channel 12 through the discharge port 28 located on a downstream side of the vertical discharge groove 27.

In the present embodiment, since the fluid is bifurcated at the guide port 21 that is the first bifurcation point, dust and the like hardly penetrate into the vertical guide groove 22. Further, the vertical guide groove 22 is formed into a roughly L-shape in plan view and it is configured so that the fluid that has flown in from the guide port 21 flows in a direction opposite to a flow of the primary flow channel 12. Since dust with a large mass, liquid and the like hardly flow in the opposite direction, the third flow channel 25 that is the detection flow channel makes it harder for dust and the like to penetrate into the vertical guide groove 22.

The reason that the vertical discharge groove 27 is formed into a roughly L-shape in cross section is that a smooth flow is secured in consideration of a balance between the upstream side and the downstream side.

According to the present embodiment, since the vertical guide grooves 22 and the vertical discharge grooves 28 are formed in order in the same direction so that they are provided in parallel, mold release of a molded product can be simultaneously performed, and it is possible to mold the secondary flow channel block 20 integrally with the primary flow pipe 11. Therefore, there is an advantage that a flow rate measuring device with a reduced number of parts and assembling processes, and high assembling accuracy can be obtained.

Next, a method of measurement with the flow rate measuring device having the above structure will be described.

First, a fluid that has flown from the upstream side of the primary flow channel 12 hits the orifice 13, whereby an influence of drift becomes smaller. Then, a part of the fluid, whose degree of drift has become smaller, flows into the vertical guide groove 22 from the guide port 21 that is the first bifurcation point. At this time, since dust and the like included in the fluid are large in mass, most of them flow to the downstream side according to the flow of the primary flow channel 12.

Since the vertical guide groove 22 has a roughly L-shape in plan view, a part of the fluid that has flown in flows in the direction opposite to the flow of the primary flow channel 12. However, since dust and the like are larger in mass than gas, they hardly flow in the opposite direction. Therefore, dust and the like flow into the vertical discharge groove 27 from the second bifurcation point 20*a* through the first secondary flow channel 23. Therefore, a fluid flowing into the second secondary flow channel 24 from the second bifurcation point 20*a* hardly includes dust and the like, and the fluid detecting element 41 is hardly contaminated.

The fluid, which has flown into the second secondary flow channel 24, is merged with a fluid flowing through another second secondary flow channel 24 at the first merging point 20*b*. Then, the merged fluid flows into the third secondary flow channel 25, passes through the flow rate detecting element 41 disposed between the opposite projections 29*a*, 29*a* so that a flow rate is measured. Subsequently, the merged fluid is bifurcated right and left at the third bifurcation point 20*c* located on the downstream side of the third secondary flow channel 25. Each bifurcated fluid flows into an upstream side of the vertical discharge groove 27 from the fourth secondary flow channel 26, and is merged with a fluid that has flown from the vertical guide groove 27 through the first secondary flow channel 23 at the second merging point 20d. The merged fluid flows downward along the vertical discharge groove 27 and flows out into the primary flow channel 12 from the discharge port 28.

The flow rate detecting element 41 detects a flow rate of a passing fluid by detecting a change in voltage based on a heat quantity deprived by the passing fluid at a predetermined speed. According to the present embodiment, since the flow rate of the fluid passing through the third secondary flow channel 25 can be set low, it is possible to use a flow rate detecting element that can only measure a low flow rate fluid, and the flow rate measuring device can be manufactured inexpensively.

Further, of a measurable region of the flow rate detecting element 41, it is possible to select a measurement region excellent in linearity by appropriately adjusting the flow rate. Therefore, a flow rate measuring device having high measurement accuracy is obtained.

In addition, the flow rate of the third secondary flow channel 25 can be adjusted to a suitable flow rate for the flow rate detection element 41 by adjusting the height and plain area of the partition wall 23a in the first secondary flow channel 23, or the cross sectional area of the second secondary flow channel 24.

Figure 16:
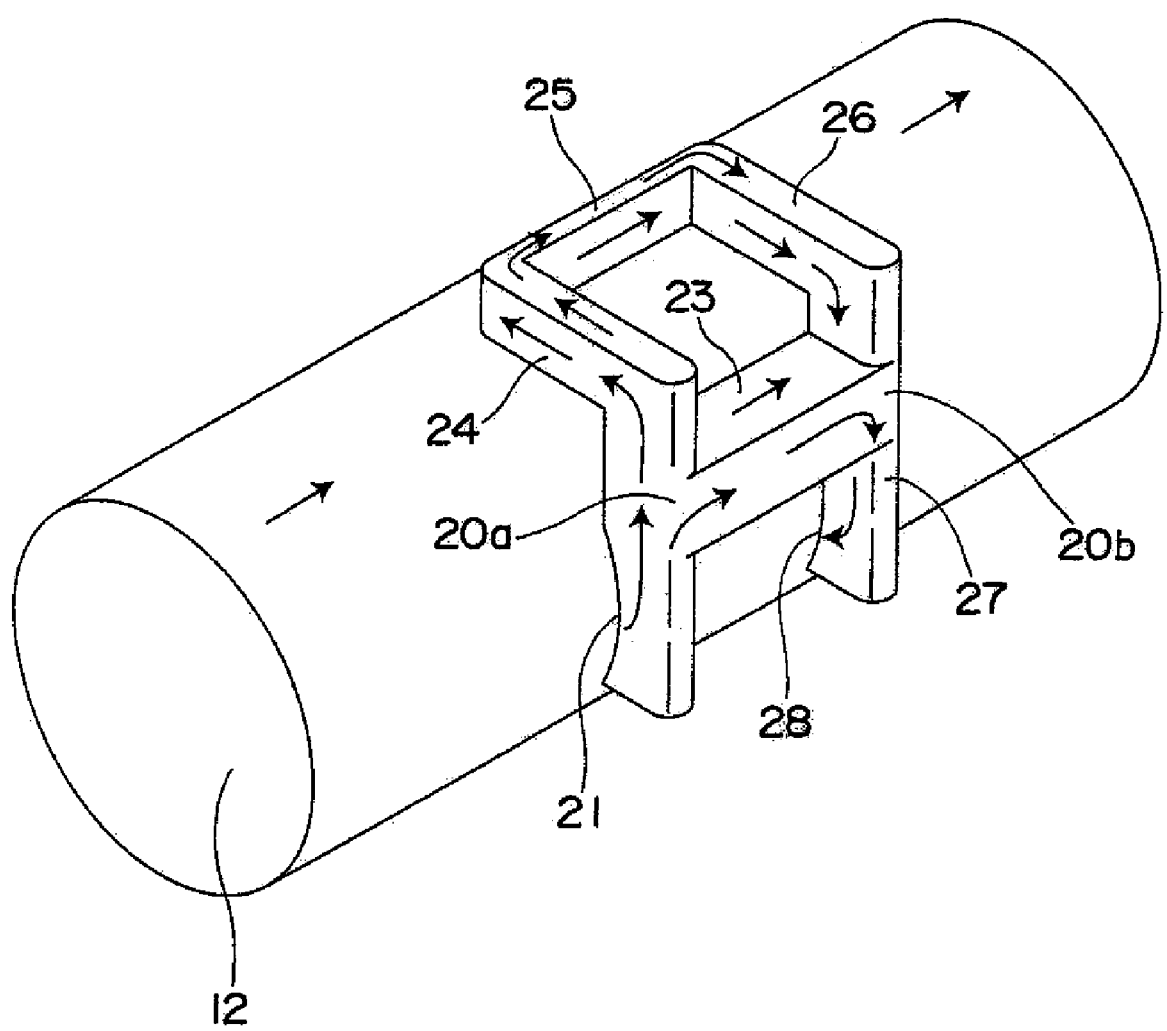
FIG. 16 is a perspective view schematically showing flow channels of another embodiment of the invention of the present application.

In the present embodiment, the fluids are merged by symmetrically providing the pair of secondary flow channels. Therefore, even if a fluid flow rate distribution in the primary flow channel is nonuniform, it is averaged, so that the measurement accuracy is improved. Note, however, that it is not necessarily required that a pair of secondary flow channels be symmetrically provided. For example, a secondary flow channel may be provided on one side of the primary flow pipe 11 as shown in FIG. 16.

INDUSTRIAL APPLICABILITY

The flow rate measuring device of the invention of the present application can be applied not only to a case of measuring a flow rate of a gas but also to a case of measuring a flow rate of a liquid.

The invention claimed is:

1. A flow rate measuring device comprising:
   a primary flow pipe having a primary flow channel through which a fluid flows,
   an orifice provided in the primary flow channel and throttling a fluid flow, and
   a secondary flow channel block provided with a secondary flow channel, the secondary flow channel block being integrally provided on the primary flow pipe, one end of the secondary flow channel block communicating with a guide port provided on an upstream side of the orifice, and the other end of the secondary flow channel block communicating with a discharge pod provided on a downstream side of the orifice, wherein the secondary flow channel comprises:
   a guide flow channel in which an upstream side communicates with the guide port serving as a first bifurcation point, and a downstream side serves as a second bifurcation point;
   a first secondary flow channel in which an upstream side is bifurcated from the guide flow channel at the second bifurcation point and formed so as to be parallel to the primary flow channel, and a downstream side communicates with the discharge port;
   a second secondary flow channel in which an upstream side is bifurcated from the guide flow channel at the second bifurcation point and formed so as to cross the primary flow channel; and
   a detection flow channel in which an upstream side communicates with a downstream side of the second secondary flow channel, a flow rate detecting element is disposed, and a downstream side communicates with the discharge port.

2. The flow rate measuring device according to claim 1, wherein a flow channel cross sectional area of the first secondary flow channel is adjustable.

3. The flow rate measuring device according to claim 2, wherein the guide flow channel, in which the guide port and the second bifurcation point located on the upstream side of the guide flow channel are located on a same vertical line, and a discharge flow channel, in which the discharge port and the discharge flow channel are located on a same vertical line, are provided in parallel.

4. The flow rate measuring device according to claim 2, wherein the guide flow channel communicating with the guide port is formed into a roughly L-shaped in cross section so that a part of a fluid that has flown in flows in a direction opposite to a flow of the primary flow channel.

5. The flow rate measuring device according to claim 1, wherein the guide flow channel, in which the guide port and the second bifurcation point located on the upstream side of the guide flow channel are located on a same vertical line, and a discharge flow channel, in which the discharge port and the discharge flow channel are located on a same vertical line, are provided in parallel.

6. The flow rate measuring device according to claim 5, wherein the guide flow channel communicating with the guide port is formed into a roughly L-shaped in cross section so that a part of a fluid that has flown in flows in a direction opposite to a flow of the primary flow channel.

7. The flow rate measuring device according to claim 1, wherein the guide flow channel communicating with the guide port is formed into a roughly L-shaped in cross section so that a part of a fluid that has flown in flows in a direction opposite to a flow of the primary flow channel.

8. A flow rate measuring device comprising:
   a primary flow pipe having a primary flow channel through which a fluid flows,
   an orifice provided in the primary flow channel and throttling a fluid flow, and
   a secondary flow channel block provided with a secondary flow channel, the secondary flow channel block being integrally provided on the primary flow pipe, one end of the secondary flow channel block communicating with a pair of guide ports oppositely provided on an upstream side of the orifice, and the other end of the secondary channel block communicating with a pair of discharge ports oppositely provided on a downstream side of the orifice, wherein the secondary flow channel comprises:
   a pair of guide flow channels in each of which an upstream side communicates with each of the guide ports serving as a first bifurcation point, and a downstream side serves as a second bifurcation point;
   a pair of first secondary flow channels in each of which an upstream side is bifurcated from each of the guide flow channels at the second bifurcation point and formed so as to be parallel to the primary flow channel, and a downstream side communicates with each of the discharge ports;
   a pair of second secondary flow channels in each of which an upstream side is bifurcated from each of the guide flow channels at the second bifurcation point and formed so as to cross the primary flow channel; and a detection flow channel, in which an upstream side communicates with a downstream side of each of the second secondary flow channels, a flow rate detecting element is disposed, and a downstream side communicates with each of the discharge ports.

9. The flow rate measuring device according to claim 8, wherein a flow channel cross sectional area of the first secondary flow channel is adjustable.

10. The flow rate measuring device according to claim 8, wherein the guide flow channel, in which the guide port and the second bifurcation point located on the upstream side of the guide flow channel are located on a same vertical Line, and a discharge flow channel, in which the discharge port and the discharge flow channel are located on a same vertical line, are provided in parallel.

11. The flow rate measuring device according to claim 8, wherein the guide flow channel communicating with the guide port is formed into a roughly L-shaped in cross section so that a part of a fluid that has flown in flows in a direction opposite to a flow of the primary flow channel.

* * * * *

UNITED STATES PATENT AND TRADEMARK OFFICE
CERTIFICATE OF CORRECTION

PATENT NO. : 7,574,908 B2
APPLICATION NO. : 11/913291
DATED : August 18, 2009
INVENTOR(S) : Naotsugu Ueda et al.

Page 1 of 1

It is certified that error appears in the above-identified patent and that said Letters Patent is hereby corrected as shown below:

In Claim 1, column 7, line 56, the word "pod" should be --port--.

In Claim 10, column 10, line 2, the word "Line" should be --line--.

Signed and Sealed this

Thirteenth Day of October, 2009

David J. Kappos
*Director of the United States Patent and Trademark Office*